Jan. 5, 1954   N. POFFENBERGER   2,665,196
MULTISTAGE INTERNAL MIXER-SETTLER EXTRACTION APPARATUS
Filed Oct. 20, 1952   3 Sheets-Sheet 1

INVENTOR.
Noland Poffenberger
BY
Griswold & Burdick
ATTORNEYS

Jan. 5, 1954     N. POFFENBERGER     2,665,196
MULTISTAGE INTERNAL MIXER-SETTLER EXTRACTION APPARATUS
Filed Oct. 20, 1952     3 Sheets—Sheet 2

INVENTOR.
Noland Poffenberger
BY
Griswold & Burdick
ATTORNEYS

Patented Jan. 5, 1954

2,665,196

UNITED STATES PATENT OFFICE 2,665,196

MULTISTAGE INTERNAL MIXER-SETTLER EXTRACTION APPARATUS

Noland Poffenberger, Midland, Mich., assignor to The Dow Chemical Company, Midland, Mich., a corporation of Delaware Application October 20, 1952, Serial No. 315,762

3 Claims. (Cl. 23—270.5)

This invention relates to an improved apparatus for use in the countercurrent extraction of liquids. It relates specifically to a multistage extractor of the internal mixer-settler type.

Several types of extractors are recognized for use with countercurrent streams of substantially immiscible liquids. The simplest of these is the spray column, in which droplets of the dispersed phase rise or fall through the continuous phase, giving true countercurrent contact between the two liquids. Spray columns have very limited efficiencies, due to the tendency of the dispersed droplets to coalesce and to recirculation in the continuous phase. Coalescence of the dispersed droplets is the major problem in spray towers of significant height, and recirculation of the continuous phase is the major problem in spray extractors of large diameter.

It has been recognized that the efficiency of an extractor can be maintained if coalescence of the dispersed droplets can be prevented, or if they can be redispersed almost as rapidly as they coalesce. To accomplish the latter result, extractor columns have been designed in which the discontinuous phase is collected at intervals along the column and is redispersed into the continuous phase. Such columns are known as mixer-settlers, and there are many known modifications. There is a mixing chamber and a settling chamber for each stage of the extractor. In some cases, the mixer is a centrifugal pump, or a chamber provided with a propeller or turbine agitator and baffles. The settling chamber is commonly provided with baffles or is filled with packing.

Mixer-settler extractors are reported to give high efficiencies, and the efficiency at each stage is the result of adequate mixing and adequate settling. Published data indicate that a large portion of the mass transfer between the two phases occurs during formation of the droplets of the dispersed phase and the rest by diffusion from the droplets. The finer these droplets can be made, the more rapid is the rate of mass transfer of the solute. Equally important, the more completely the two phases are separated in the settling chamber, the greater is the efficiency of extraction in each stage.

Some of the prior mixer-settler extraction systems have employed a series of settling chambers, with external mixing devices for each chamber and with distribution from the mixers to each of the adjacent chambers. Such apparatus, though efficient, is cumbersome and expensive. Other prior devices have internal mixers, with alternate mixing and settling chambers, but have not been susceptible to easy access to the internal working parts for cleaning, repair or replacement, and prolonged shut-downs have been necessary to effect even minor internal adjustments.

The usual mode of operation of mixer-settler extractors has involved establishing a rate of flow $F_L$ for the light liquid rising through the apparatus and a rate $F_H$ for the heavy liquid flowing down through the extractor, while mixing the liquids at each stage and allowing them to separate at these established rates. An improved method of operating mixer-settler extractors forms the subject matter of a concurrently filed application of the same inventor, Serial No. 315,761. That method differs from the prior method in that there is maintained a single static liquid-liquid interface in the extractor and there is circulated into each mixing zone in unit time an amount of heavy liquid from the next higher settling zone and an amount of light liquid from the next lower settling zone much greater than $F_H$ and $F_L$, respectively; the liquids are mixed and expelled from the mixing zone into each of the adjacent settling zones in total amounts greater than the sum of $F_H$ and $F_L$; and the flow of liquids to and from the mixing zones is confined to small channels such as to assure that their velocities at these points are high enough to prevent bypassing the mixer by counterflow of the other phase.

It is among the objects of this invention to provide a multistage internal mixer-settler extraction apparatus from which the internal working parts, particularly the moving parts, may be removed easily for cleaning, adjustment or repair with a minimum shut-down period.

Another object is to provide apparatus having a vertical tier of mixing and settling zones, capable of operation with a single fixed liquid-liquid interface, and having control ports between the mixing and settling zones to assure the sequence of mixing, redispersion and settling operations which constitute the method of the said concurrently filed application.

The apparatus of the invention comprises a vertically disposed cylindrical vessel with at least one head having a coaxial access port therein. Horizontally disposed at intervals along the height of the cylinder is a series of an even number of plates, each having a central opening therethrough of uniform size which is no larger than the said access port, said plates dividing the cylinder into an odd number of tiered compartments. Preferably, the end compartments and alternate ones therebetween have greater height than the rest. The said plates are provided, near their respective peripheries, with restricted passageways for flow of fluid from one side of the plates to the other. Coaxially disposed within the cylinder is a rotor shaft bearing a series of driven impellers and other elements to be described hereinafter, all forming what will be termed herein "the core assembly." The core assembly comprises a group of tie-rods disposed parallel to and equidistant from the central rotor shaft. These rods carry horizontal disks of diameter just smaller than the diameter of the central openings in the plates mounted in the cylindrical vessel, said disks being mounted on the tie-rods the same distances apart as the spacing between the several plates in the main vessel. These disks have central openings permitting free rotation of the axial shaft and flow of fluid from one side of the disk to the other. In addition to the disks which form part of the plates between compartments in the cylindrical vessel, the core assembly may comprise baffling means to arrest any swirling action in the settling compartments. In the second and other even numbered compartments of the vessel, the rotor shaft carries vertical impellers, rotatable with the shaft, and disposed radially about the axis of rotation. The end compartments and alternate ones therebetween are settling compartments, while the even-numbered compartments are mixing sections of the apparatus. A port is provided in one of the lower compartments for introduction of the feed of lower density, and another such port is provided in one of the upper compartments for introduction of the feed of higher density. An outlet port is provided in the uppermost compartment for withdrawal of the light phase and a similar outlet is provided in the lowermost compartment for withdrawal of the heavy phase. Operation of the extractor will be described hereinafter.

The invention may be understood, and will be described with reference to the annexed drawings, in which Fig. 1 is a view in vertical section through the cylindrical shell of the apparatus, taken along line 1—1 of Fig. 2;

Figure 1:
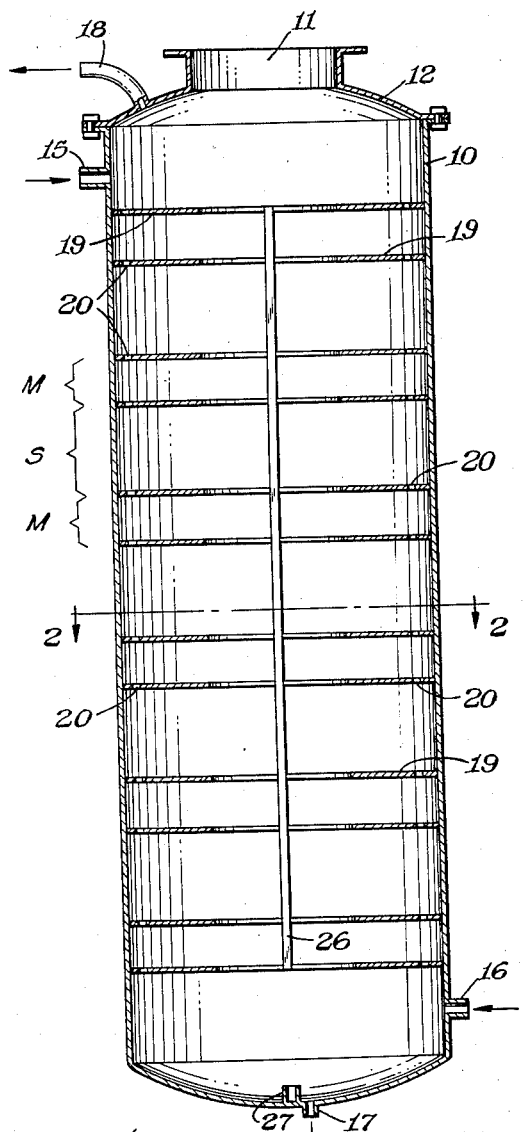
Figure 3:
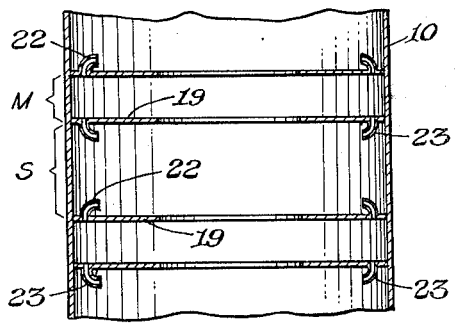
Figs 3 and 4 are fragmentary views similar to Fig. 1, but showing alternative forms of passages through the transverse plates.
Figure 4:
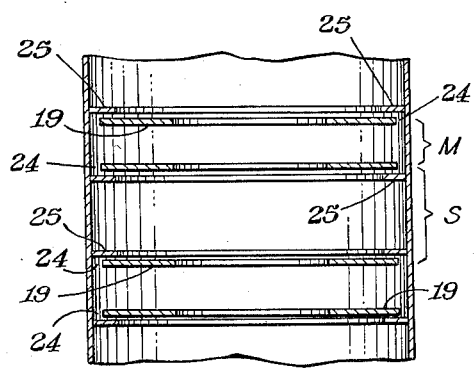

A vertically disposed cylindrical vessel 10 is provided with a circular access port 11 concentric with the cylinder, in one head 12, which is closed by cover-plate 13 (Fig. 5) bearing axially disposed rotor shaft 14 and the core assembly to be described later. A heavy phase inlet 15 is provided near the top of the cylinder 10, and a light phase inlet 16 is provided near the lower end thereof. A heavy phase outlet 17 is provided in the bottom of the vessel and a light phase outlet 18 is provided in the top. An even number of horizontal plates 19 is spaced along the cylinder 10, dividing the latter into an odd number of compartments. Each plate 19 has a central opening, all of uniform size and no larger than access port 11, for insertion and removal of the core assembly. In the embodiment shown in Fig. 1, plates 19 have the same diameter as the interior of cylinder 10, and each plate has a plurality of perforations 20 near its periphery to serve as interzonal fluid passageways. In the embodiment shown in Fig. 3, the inwardly directed risers 22 and downcomers 23 serve to direct liquid flow toward the center of the cylinder. The plates shown in Fig. 4 are of slightly smaller diameter than cylinder 10, to provide peripheral passageways 24, and horizontal rings 25 cooperate with these passageways for the same purpose. In the last described embodiment, tie-rods or brackets are needed to hold the plates 19 in position, but these have been omitted from Fig. 4 for clarity. In Figs. 1, 3 and 4, the cylinder 10 is illustrated as having settling chambers S about twice the height of the mixing chamber M. This proportion is not critical, but it is preferable that the settling zones be deeper than the mixing zones. In the taller multiple stage extractors it is desirable to provide three or more guide rails 26 disposed symmetrically about the axis of the cylinder 10 and set flush with the edge of the central openings in plates 19, to facilitate insertion and removal of the core assembly. A bearing 27 is provided in the normally closed end of cylinder 10, coaxial with the cylinder, to receive the end of rotor shaft 14 when the core assembly is in place.

Figure 5:
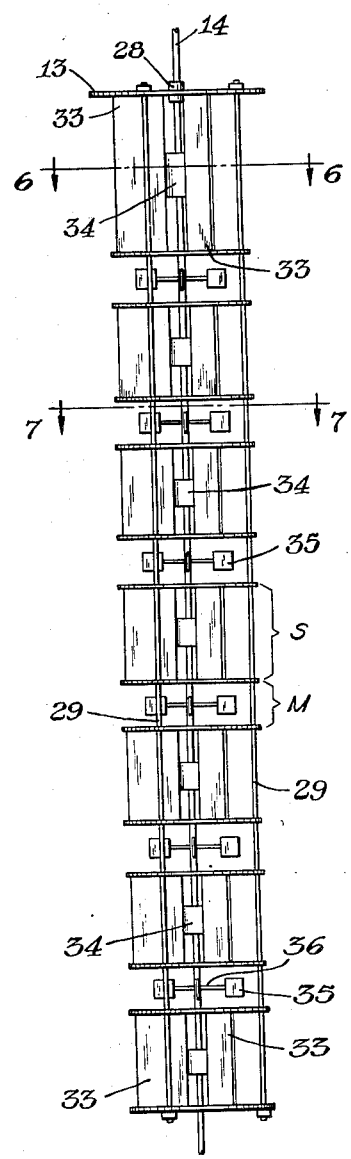
Fig. 5 is an elevation of the core assembly, with certain elements shown in vertical section.
Figure 2:
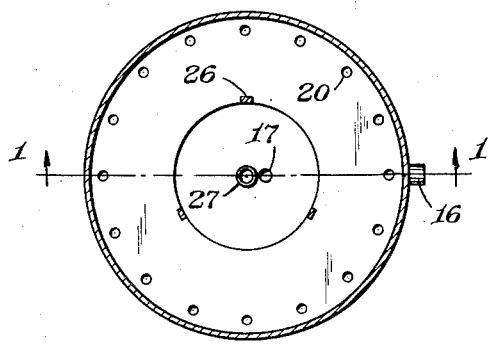
Fig. 2 is a transverse section taken along line 2—2 of Fig. 1.
Figure 6:
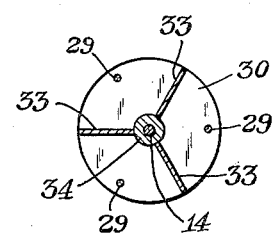
Fig. 6 is a horizontal section through that part of the core assembly in a settling zone, taken along line 6—6 of Fig. 5.
Figure 7:
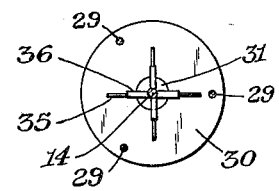
Fig. 7 is a similar section through that part of the core assembly in a mixing zone, taken along line 7—7 of Fig. 5.
Figure 8:
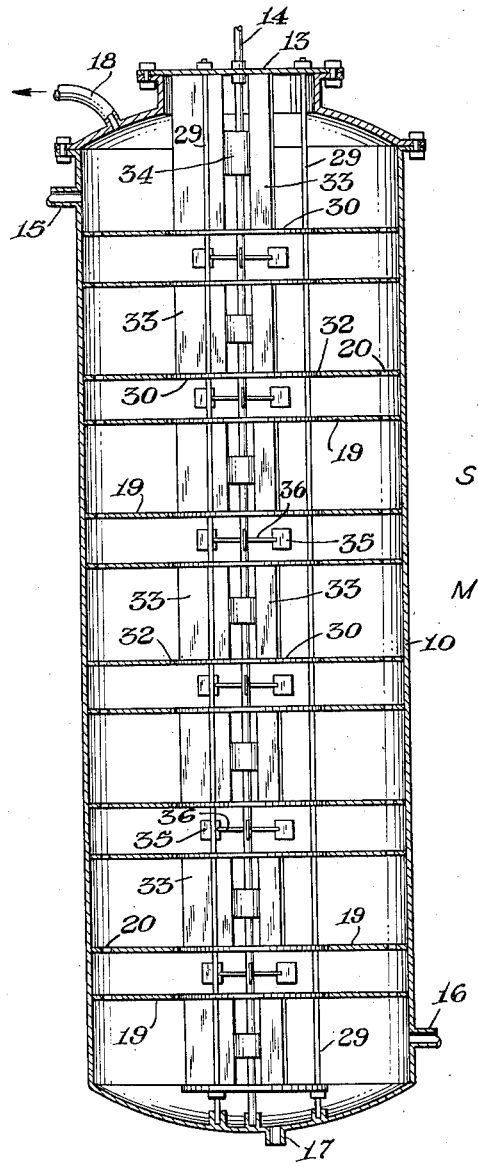
Fig. 8 shows the assembled apparatus.

Rotor shaft 14 passes through an axial bearing 28 in coverplate 13, and axially through the core assembly shown in Fig. 5. A plurality of tie-rods 29 passes through coverplate 13 and supports a series of disks 30 in horizontal planes, spaced so as to coincide with the planes of plates 19 when the core assembly is positioned in the cylindrical shell. Each of the disks 30 is centrally bored for free rotation of the shaft 14 and to provide a small annular passageway 31 (Fig. 7) for flow of liquid along rotor 14 from one side of each disk 30 to the other. Disks 30 are all of the same diameter, just slightly smaller than the diameter of the central openings in plates 19, to leave a small annular passageway 32 (Fig. 8) for flow of liquids from one side to the other of plates 19 and disks 30. The face of each disk 30 which is directed toward a settling chamber S may carry a plurality of radially disposed vertical vanes 33 to serve as baffles for damping any swirling action in the liquids in such chambers, or such baffle vanes may be similarly disposed in the settling chambers on supports other than disks 30. The baffle vanes 33 may be attached at their inner edges to axial bearings 34 for shaft 14. In each of the mixing chambers a plurality of radially disposed vertical impeller blades 35 is mounted for rotation on shaft 14, the combined radial lengths of each blade 35 and its supporting member 36 being short enough to permit rotation without interference from tie-rods 29. The supports 36 for impeller blades 35 may be radial arms, as illustrated in Fig. 7, or they may be disks mounted for rotation with shaft 14.

The apparatus described may be built with as many or as few mixing and settling zones as desired, and the core assembly may be removed and replaced readily through the access port 11.

Figure 9:
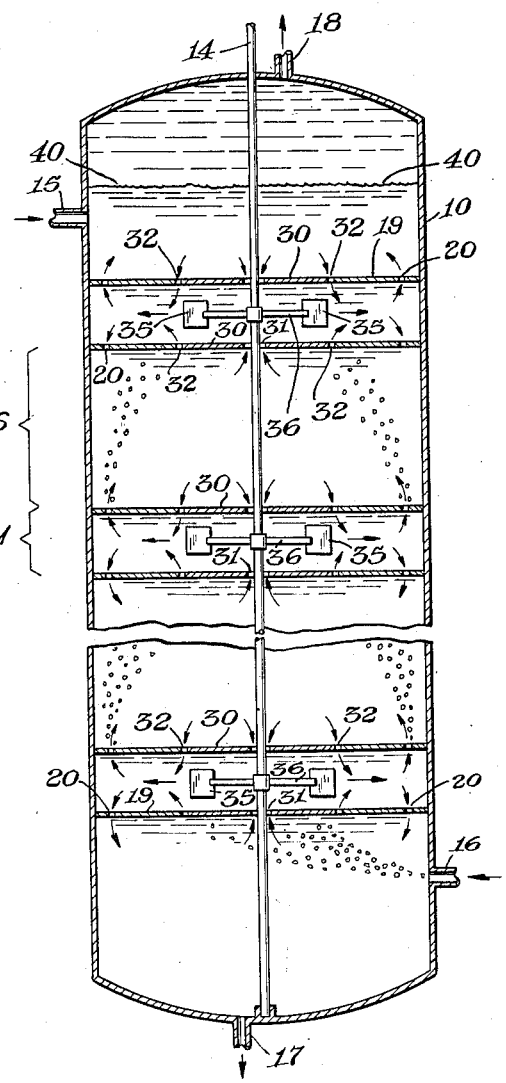
Fig. 9 is a simplified view of the apparatus, showing the flow of two liquid phases therethrough during countercurrent extraction operations.

The apparatus may be operated with either the heavy liquid or the light liquid as the disperse phase. By adjusting the rate of withdrawal of the heavy liquid, a single fixed liquid-liquid interface can be maintained at any desired level in the system. Above the interface, the light liquid is the continuous phase and below it the heavy liquid is the continuous phase. The control interface is most commonly maintained in one of the end settling compartments. In the flow diagram of Fig. 9, the interface 40 is shown in the uppermost settling chamber, and the light liquid is the disperse phase through all of the rest of the column, as illustrated by the rising droplets.

In operation, the extractor is nearly filled with the liquid which is to be the continuous phase. Enough of the other liquid is introduced to complete the filling of the extractor. The rotor shaft 14 and its supported impeller blades 35 are set in motion and the two liquids are introduced through their inlets 15, 16 at the desired rates. The light layer overflows freely or through a pressure controlled valve, and the heavy layer is withdrawn at a rate that will maintain interface 40 at the desired level. Assuming the light liquid is the disperse phase, as illustrated, it rises from inlet 16 and tends to layer beneath the nearest plate 19 and disk 30. The outward thrust of impellers 35 in the adjacent mixing chamber draws the light liquid upward through passageways 31 and 32 and some of the heavy liquid from the next higher settling zone is simultaneously drawn down through similar passageways 31, 32 into the same mixing zone, where redispersion occurs. The mixed liquids are impelled outwardly toward the periphery of cylinder 10 and part of the mixture is displaced downwardly through passageways 20, 23 or 24 while the rest of the mixture is displaced upwardly through passageways 20, 22 or 24 into adjacent settling chambers. Radially disposed vertical baffles 33, and, if desired, similar baffles in the cylindrical shell, minimize the surging and haphazard recirculation of the continuous phase, and the liquids separate again into layers along the surfaces of plates 19 and disks 30 in the settling chamber. The heavy layer is drawn down through passageways 31, 32 into the next lower mixing chamber while the light layer is drawn up through similar passageways into the next higher mixing chamber. The process repeats itself continuously, with the light phase finally layering below the outlet port 18 in the uppermost chamber while the heavy phase settles above outlet 17 in the lowermost chamber. The settled heavy and light phases are withdrawn through outlets 17, 18 at the respective rates at which they are being introduced through inlets 15, 16, modified only by the volume change accompanying the extractive interchange between the phases during their counterflow through the extractor. End-to-end flow through the extractor is prevented principally by the liquid velocities induced through interzonal passages 31, 32 at the suction side of the mixers and through interzonal passages 20, 22, 23, 24 on the discharge side of the mixers. Rotor shaft 14 is driven at a sufficient speed to induce velocities at these points which prevent counterflow. End-to-end flow along rotor shaft 14 may be prevented further by mounting impeller blades 35 on horizontal disks secured axially to shaft 14. During its traverse of the system, each particle of the disperse phase is collected and redispersed many more times (from 2 to 10 or more) than the number of mixing stages, due to the large volume handled at each stage relative to the volumes of the two phases fed to the extractor.

In a specific example, a small 8-stage extractor was constructed in accordance with the invention, having a 4-inch core assembly and 6-inch diameter settling sections. A brine mixture, containing 1.28 per cent by weight of phenol, was introduced as the continuous phase through inlet 15 at the rate of 1.1 gallons per minute, and benzene was introduced through inlet 16 at the rate of 0.275 gallon per minute. The benzene became the disperse phase. The impellers were driven at 240 revolutions per minute. The exit brine withdrawn through port 17 contained at most 0.0033 per cent phenol, while the benzene extract, withdrawn through port 18, contained 5.28 per cent phenol, by weight. The stage efficiency was about 75 per cent.

A similar extractor was constructed with two stages, the impellers being 4 inches in diameter, the core assembly 6 inches in diameter, and the settling sections 15 inches in diameter. A similar brine-phenol feed was used, countercurrent to benzene, at rates of 1.5 gallons per minute of brine and 0.5 gallon per minute of benzene. Counterflow through the interzonal ports was prevented and optimum extraction occurred with a rotor speed of 240 revolutions per minute. Analyses at the inlets and outlets showed:

|  | Per cent phenol, by weight |
|---|---|
| Incoming brine | 1.12 |
| Exit brine | 0.116 |
| Exit benzene | 3.71 |

The stage efficiency in this case was 91 per cent.

I claim:

1. An internal mixer-settler counterflow extractor apparatus comprising a vertical cylindrical vessel, having an access port in one head thereof, said vessel being divided into terminal settling chambers with alternate mixing and settling chambers therebetween by horizontal plates therein, each with a circular coaxial opening therethrough of a diameter no larger than that of said access port; a coverplate for said access port, supporting a plurality of disks of diameter just less than that of the openings in said plates and spaced apart so that one such disk lies in the plane of each of said plates when the access port is closed with the coverplate; a rotor shaft coaxial with the cylinder and extending through the coverplate and through the said disks; all of the aforesaid disks having a central opening to allow free movement of said rotor shaft and for flow of liquid from one face of said disks to the other; vertically disposed radial impeller blades, in each of the mixing chambers and mounted on the central shaft for rotation therewith; symmetrically disposed passageways near the periphery of each of said plates for movement of liquids from one chamber to another; means cooperative with said passageways in each of the settling chambers to divert liquid flow toward the center of the cylinder; an inlet for liquid feed to one of the two uppermost chambers; a similar inlet to one of the two lowermost chambers; outlets from each of the two end chambers; and means for driving the rotor shaft and its attached impellers.

2. The apparatus claimed in claim 1, wherein each disk lying in the plane of one of said plates bears on its face directed toward a settling chamber a plurality of evenly distributed vertical, radially disposed baffles.

3. The apparatus claimed in claim 1, wherein the settling chambers are of greater height than the mixing chambers.

NOLAND POFFENBERGER.

No references cited.